United States Patent
Schat et al.

(10) Patent No.: US 10,670,699 B2
(45) Date of Patent: Jun. 2, 2020

(54) RF RADAR DEVICE BIST USING NOISE INJECTION

(71) Applicant: NXP B.V., Eindhoven (NL)

(72) Inventors: Jan-Peter Schat, Hamburg (DE); Abdellatif Zanati, Hamburg (DE)

(73) Assignee: NXP B.V., San Jose, CA (US)

( * ) Notice: Subject to any disclaimer, the term of this patent is extended or adjusted under 35 U.S.C. 154(b) by 258 days.

(21) Appl. No.: 15/697,827

(22) Filed: Sep. 7, 2017

(65) Prior Publication Data

US 2019/0072647 A1  Mar. 7, 2019

(51) Int. Cl.
- G01S 7/40 (2006.01)
- G01S 7/35 (2006.01)
- G01S 13/931 (2020.01)
- G01S 13/58 (2006.01)

(52) U.S. Cl.
CPC ............ *G01S 7/4056* (2013.01); *G01S 7/354* (2013.01); *G01S 7/4017* (2013.01); *G01S 13/584* (2013.01); *G01S 13/931* (2013.01); *G01S 2007/4069* (2013.01)

(58) Field of Classification Search
CPC ........................ G01S 7/4056; G01S 2007/4069
USPC ................................................. 342/128, 168
See application file for complete search history.

(56) References Cited

U.S. PATENT DOCUMENTS

| | | |
|---|---|---|
| 3,188,635 A | 6/1965 | Hosking |
| 4,329,688 A | 5/1982 | Goldie |
| 6,545,634 B1 | 4/2003 | Heide et al. |
| 6,703,969 B2 | 3/2004 | Winter et al. |
| 2001/0035839 A1* | 11/2001 | Shiratori ............ G01S 7/40 342/128 |
| 2017/0153318 A1* | 6/2017 | Melzer ............... G01S 7/4056 |

OTHER PUBLICATIONS

Martin et al. "Wide Bandwidth System identification of AC System Impedances by Applying Pertubations to an Existing Converter," Energy Conversion Congress and Exposition (ECCE), Sep. 2001 IEEE, 8 pages.
Laknaur et al., "A Programmable Window Comparator for Analog Online Testing," 25th IEEE VLSI Test Symposium, 2007, 6 pages.
Kim, Byoungho, "Dithering Loopback-Based Prediction Technique for Mixed-Signal Embedded System Specifications," IEEE Transaction on Circuits and Systems II, Express Briefs, vol. 63, No. 2, Feb. 2016, 5 pages.

(Continued)

*Primary Examiner* — Bo Fan

(57) ABSTRACT

Embodiments are provided for a radar device and a method for operating a radar device, the radar device having a transmitter and a receiver, the method including: generating a noise signal; mixing the noise signal with a transmitter output radio frequency (RF) signal to produce an intermediate signal, wherein the transmitter output RF signal is a version of a local oscillator (LO) signal having linearly increasing frequency; attenuating the intermediate signal to produce a test signal; adding the test signal to a receiver input RF signal to produce a combined receiver input RF signal; downmixing an amplified version of the combined receiver input RF signal with the LO signal to produce a combined low frequency signal; and correlating the combined low frequency signal with the noise signal to produce an error detection signal.

11 Claims, 4 Drawing Sheets

(56) References Cited

OTHER PUBLICATIONS

Melzer et al, "Phase Noise Estimation in FMCW Radar Transceivers Using an Artificial On-Chip Target," IEEE Transactions on Microwave Theory and Techniques, vol. 64, Issue 12, Dec. 2016, 4 pages.
Lin et al, "Transmitter Noise Cancellation in Monostatic FMCW Radar," Microwave Symposium Digest, Jun. 2006, IEEE MTT-S International, 4 pages.
Lin et al, "A Ka-Band FMCW Radar Front-End With Adaptive Leakage Cancellation," IEEE Transactions on Microwave Theory and Techniques, vol. 54, No. 12, Dec. 2006, 8 pages.
Melzer et al., "Short-Range Leakage Cancellation in FMCW Radar Transceivers Using an Artificial On-Chip Target," IEEE Journal of Selected Topics in Signal Processing, vol. 9, No. 8, Dec. 2015, 11 pages.

\* cited by examiner

RF RADAR DEVICE BIST USING NOISE INJECTION

BACKGROUND

Field

This disclosure relates generally to radar systems, and more specifically, to a radar device that implements built-in self-test (BIST) using noise injection.

Related Art

Vehicles are often equipped with electronic control systems to assist drivers in controlling the vehicle. Such systems may include radio frequency (RF) radar systems that determine the distance and velocity of objects in the surrounding environment of the vehicle. It is important that RF radar systems are able to detect and address various failure mechanisms, such as transient faults, during runtime operation of the RF radar system, where such failures can be especially disastrous in an automotive environment.

BRIEF DESCRIPTION OF THE DRAWINGS

The present invention may be better understood, and its numerous objects, features, and advantages made apparent to those skilled in the art by referencing the accompanying drawings.

The present invention is illustrated by way of example and is not limited by the accompanying figures, in which like references indicate similar elements, unless otherwise noted. Elements in the figures are illustrated for simplicity and clarity and have not necessarily been drawn to scale.

DETAILED DESCRIPTION

The following sets forth a detailed description of various embodiments intended to be illustrative of the invention and should not be taken to be limiting.

Overview

Figure 1:
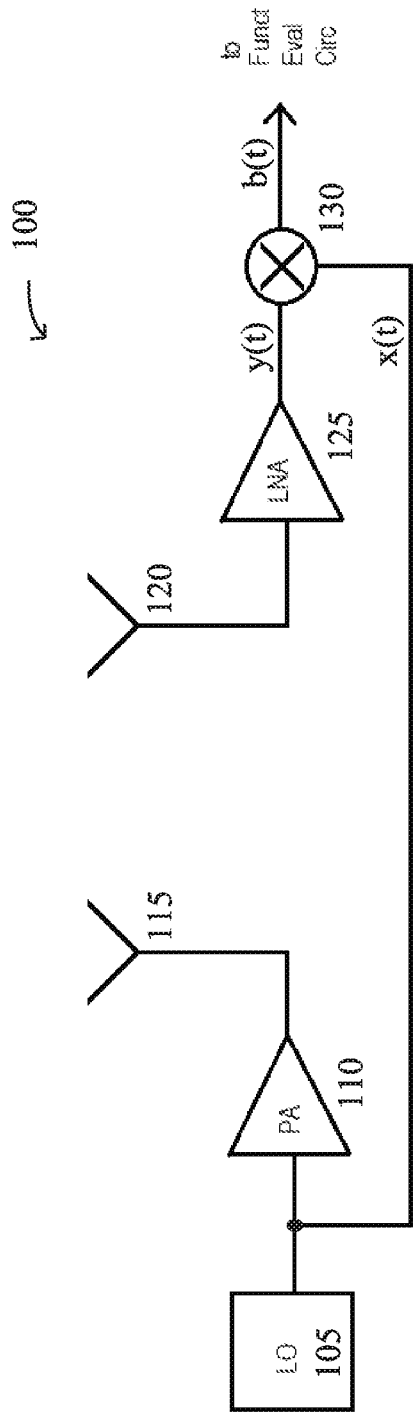
FIG. 1 illustrates a block diagram depicting an example RF radar system.

The electronic control systems implemented in a vehicle must meet stringent automotive safety standards to ensure driver safety. These standards include functional safety standards that require an electronic control system to continue to operate correctly even under failure mode conditions. For example, transient faults are required to be detected during functional operation of the electronic control system, such as in a radio frequency (RF) radar system like that shown in FIG. 1. An example RF radar system 100 is shown in FIG. 1 and includes a local oscillator (LO) 105, a power amplifier (PA) 110, and a transmitting (Tx) antenna 115 that implement a transmitter. Radar system 100 also includes a receiving (Rx) antenna 120, a low noise amplifier (LNA) 125, and a mixer 130 that implement a receiver. The components shown in FIG. 1 may also be referred to as an RF block of the RF radar system 100, where the radar system 100 may also include other components such as control logic, a functional evaluation circuit, and digital signal processing. During functional operation, the transmitter drives an output signal on Tx antenna 115, which backscatters off an object in the range of radar system 100, and an echo signal is received on Rx antenna 120. Since the echo signal is delayed in time as compared with the transmitter output signal, the RF block outputs a signal indicating the relationship between the echo signal and the transmitter output signal, which is processed by the functional evaluation circuit and provided to digital signal processing to determine information about the object.

Transient faults may occur due to exposure of the RF radar system to cosmic rays, which may change the contents of registers that control an RF block of the RF radar system (e.g., flipping the bit stored in a flip-flop, which changes a transmitter or receiver gain setting), or may directly impact the RF block by disturbing its internal signals. In some cases, these transient faults may cause the RF block to provide inaccurate output signals that lead to a false interpretation by the RF radar system, which may result in failure to detect existing objects, inaccurate measurements of size, distance, or velocity of an existing object, or false detection of objects that do not exist.

Figure 2:
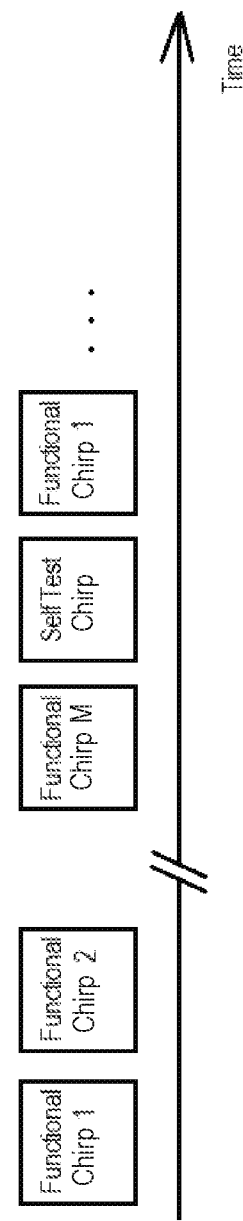
FIG. 2 illustrates a time diagram representative of the operation of the RF radar system of FIG. 1.

One approach to correcting such a false interpretation includes running a conventional built-in self-test. However, a conventional built-in self-test is usually run in a dedicated test mode rather than during functional operation of the RF block, as shown in the timing diagram of FIG. 2. The timing diagram shows functional operation of the RF block as a sequence of several blocks of time, during which the transmitter drives the Tx antenna with the output signal, also referred to as a functional chirp. The dedicated test mode is interleaved after some Mth functional chirp, where the transmitter drives the Tx with the testing output signal or testing chirp and the built-in self-test is performed (e.g., to determine if the transmitter and receiver path is still functional). As a result, object detection cannot be performed during the self-test. Functional operation of the RF block resumes after the built-in self-test is performed.

Other approaches to correcting the false interpretation include performing a plausibility check of the RF block's output signal, or by simply repeating the measurement. However, a plausibility check may be error-prone by accepting an incorrect signal that falls within the acceptable tolerance or by rejecting a correct signal that falls outside of the acceptable tolerance, and repeating the measurement takes time. In fact, each of these correction approaches take time away from the functional operation of the RF block to perform object detection. Further, these correction approaches are often unable to detect transient faults in real time due to their sudden appearance and short duration (e.g., a few microseconds), where these correction approaches may not even be triggered until a time after the transient fault has disappeared. Such correction approaches are better suited for detecting permanent faults, such as a permanent error condition of a short or open circuit (e.g., due to the presence of unwanted particles in the RF block).

The present disclosure provides a built-in self-test (BIST) solution that is capable of detecting disturbances in real time during functional operation of the RF radar system. The BIST circuitry includes a permanent feedback path from the output of the transmitter to the input of the receiver. The feedback path has high attenuation that prevents functional operation of the RF radar system from being disturbed. The transmitter output signal is mixed with deterministic phase noise and attenuated to produce a low-amplitude test signal. The echo signal received at the input of the receiver is overlaid with the test signal. The BIST circuitry also includes a correlator configured to correlate the receiver input signal (which includes both the echo signal and the test signal) with this phase noise. The result of the correlation is a DC voltage, or error detection signal, that is directly proportional to the transmitter output power, the attenuation of the feedback path from transmitter output to receiver input, and the receiver gain. Defects or faults of the transmitter and receiver, including their mixers and their digital control circuits, may be detected based on a present value of the error detection signal as compared to an expected value. Defects or faults of the transmitting and receiving antennas may also be detected since such defects or faults often cause impedance mismatch at the transmitter output or at the receiver input. This mismatch changes the transmitter output power level or the input impedance of the receiver, which changes the power level of the overlaid noise signal at the receiver input and in turn changes the value of the error detection signal.

Example Embodiments

Figures 3, 4:
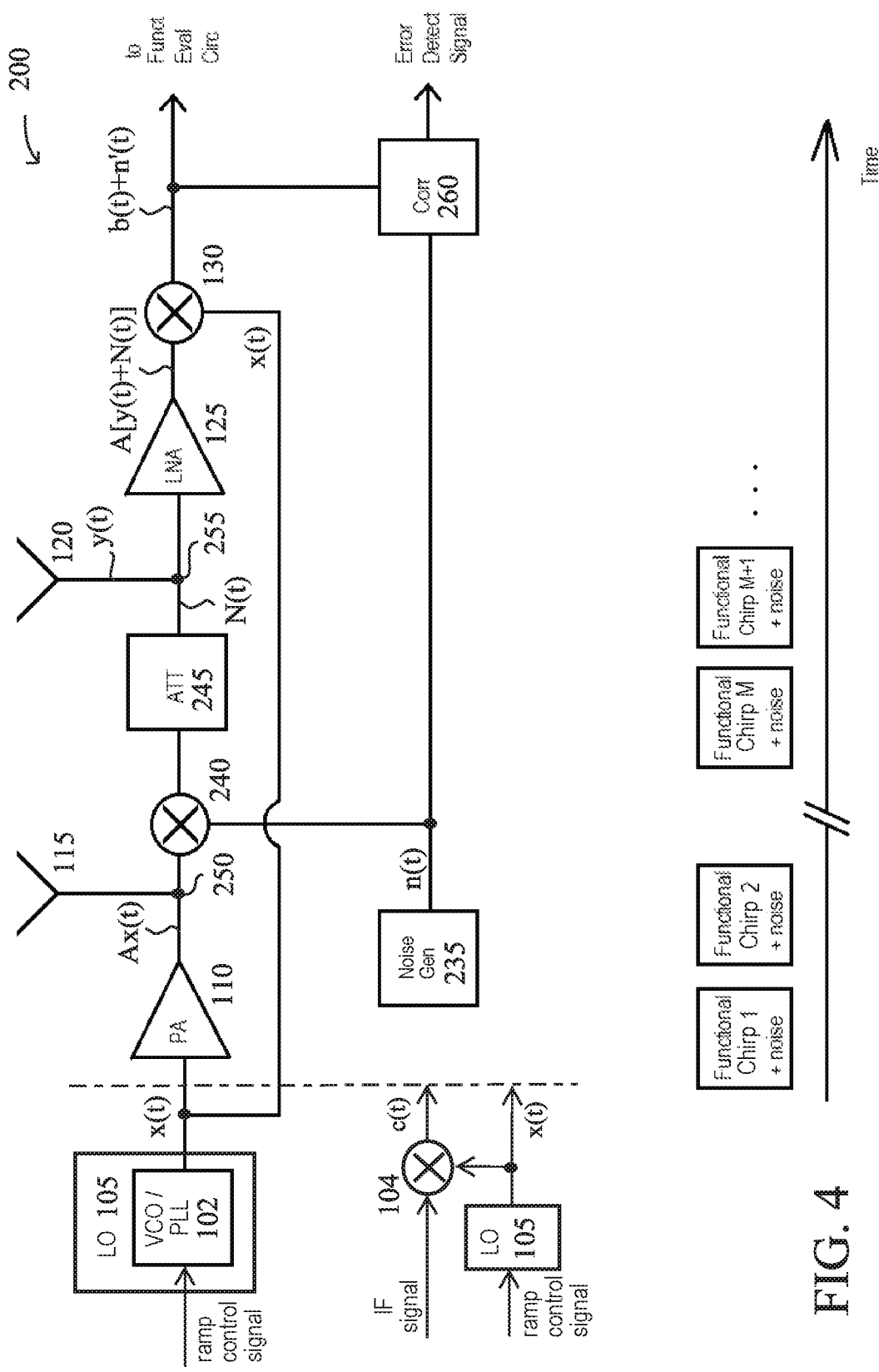
FIG. 3 illustrates a block diagram depicting an example RF radar system with built-in self-test (BIST) circuitry in which the present disclosure is implemented, according to some embodiments of the present disclosure.
FIG. 4 illustrates a time diagram representative of the operation of the RF radar system with BIST circuitry of FIG. 3, according to some embodiments of the present disclosure.

FIG. 3 illustrates a block diagram depicting an example radio frequency (RF) radar system 200 with built-in self-test (BIST) circuitry. Radar system 200 includes local oscillator (LO) 105, power amplifier (PA) 110, and transmitting (Tx) antenna 115 that implement a transmitter. Radar system 200 includes receiving (Rx) antenna 120, low noise amplifier (LNA) 125, and mixer 130 that implement a receiver. The components shown in FIG. 3 may also be referred to as an RF block of the RF radar system 200, or may be referred to as a transceiver. Radar system 200 also includes noise generator 235, mixer 240, attenuator 245, and correlator 260 that implement the BIST circuitry. Mixer 240 and attenuator 245 form a permanent feedback path from the output of the transmitter to the input of the receiver, as further discussed below.

In the embodiment shown, Tx antenna 115 and Rx antenna 120 are implemented as separate antennas, although a single antenna that serves as both the Tx antenna 115 and Rx antenna 120 may be used in other embodiments (which requires a circulator or other coupling device for connecting the transmitter output to the antenna during a transmission phase and connecting the receiver input to the antenna during a receive phase).

In some embodiments, LO 105 is configured to output an LO signal x(t) that implements the functional chirp or chirp signal x(t), which is shown at the top left of FIG. 3. The LO/chirp signal x(t) is a sinusoidal RF signal having an instantaneous frequency that linearly increases or decreases over time in a periodic manner, where the change in frequency provides periodic cycles used for time reference. In other words, the LO/chirp signal is a frequency-modulated continuous-wave (FMCW) RF signal. In such embodiments, the LO/chirp signal x(t) is provided to PA 110 and is also used to downmix the received echo signal at mixer 130, which would provide a low frequency or baseband signal at the output of mixer 130, as further discussed below. As shown in the top left of FIG. 3, LO 105 is implemented using a voltage controlled oscillator (VCO) 102, which may also include a phase locked loop (PLL) in some embodiments. VCO/PLL 102 receives a voltage control signal from control logic 335 (further discussed in connection with FIG. 5), which is a periodic ramp control signal that linearly increases or decreases over time. In response, VCO/PLL 102 outputs a sinusoidal RF signal x(t) having an instantaneous frequency that linearly increases or decreases over time, corresponding to the ramp control signal. Examples of the voltage control signal include but are not limited to a sawtooth signal, a triangular signal, or other suitable signal.

In other embodiments, LO 105 is configured to output a dedicated LO signal x(t), which is further mixed with an IF signal to produce chirp signal c(t), which is shown at the bottom left of FIG. 3. The LO signal x(t) is similarly output by VCO/PLL 102 in response to a ramp voltage control signal received from control logic 335, where the dedicated LO signal x(t) is a sinusoidal RF signal having a frequency that linearly increases or decreases over time in a periodic manner, where the change in frequency provides periodic cycles used for time reference. An intermediate frequency (IF) signal may be provided, such as by a functional signal generator. Mixer 104 is configured to use the dedicated LO signal x(t) to upmix or upconvert the IF signal into an RF chirp signal c(t), which is provided to PA 110. The dedicated LO signal x(t) is also used to downmix the received echo signal at mixer 130, which would produce an IF signal at the output of mixer 130. Examples of the periodic ramp signal include but are not limited to a sawtooth signal, a triangular signal, or other suitable signal.

In some embodiments, LO 105 is configured to generate signals in the operational frequency range of 23 GHz to 81 GHz, such as in an operational frequency band around 77 GHz (e.g., with frequency ramping up from 77 GHz to 77.5 GHz) or in an operational frequency band around 24 GHz. An example chirp signal may sweep over 2 GHz in 30 µs (microseconds). Some embodiments of LO 105 may also include a filter (e.g., a bandpass filter) that filters out any unwanted aspects, such as spikes or harmonics, from the generated chirp signal.

PA 110 is configured to convert the low power chirp signal, which may be either signal x(t) or signal c(t), into a higher power output signal by some amplification factor A, denoted as A·x(t). The output of PA 110 is connected to Tx antenna 115, where PA 110 drives Tx antenna 115 to radiate the output (chirp) signal continuously for some duration. An object in the surrounding environment within range of the radar system 200 backscatters an echo of the output signal to Rx antenna 120. The signal power of the echo signal at Rx antenna 120 is generally much less than the signal power of the output signal at Tx antenna 115.

Rx antenna 120 is connected to an input of LNA 125, which is configured to amplify a very low power signal at its input node 255 without significantly degrading its signal-to-noise ratio (SNR). The output of LNA 125 is connected to a first input of mixer 130 and the output of LO 105 is connected to a second input of mixer 130.

It is noted that in a typical RF radar system like that shown in FIG. 1, the echo signal is amplified by LNA 125 and is provided as echo signal y(t) at the first input of mixer 130, and the LO signal x(t) is provided at the second input of mixer 130, where both signals x(t) and y(t) are RF signals. Mixer 130 is configured to downmix echo signal y(t) using the LO signal x(t), which downconverts the echo signal y(t) into a low frequency signal b(t) having low frequency components in the frequency domain, also referred to as DC components. This low frequency range may be the baseband range from 0 Hz to some higher frequency, where signal b(t) is referred to as a baseband signal (e.g., the demodulated echo signal), or this low frequency range may be an intermediate frequency (IF) signal (or a higher frequency band above the baseband and below the operational RF frequency band). Signal b(t) is provided to a functional evaluation circuit for further filtering and processing, in preparation for digital signal processing that determines distance and velocity information of the object in the surrounding environment. For example, since the echo signal y(t) has traveled from Tx antenna 115 to the object and back to the Rx antenna 120, the echo signal y(t) is delayed in time from the LO signal x(t) by some time difference $\Delta t$. This also means that at any given time, there is an instantaneous frequency difference $\Delta f$ between the echo signal y(t) and the LO signal x(t), which is proportional to the distance to the object (provided that the LO signal x(t) has a linear increase in frequency). Velocity information of the object may also be obtained based on whether a Doppler frequency (caused by the speed of the object) is also present in the echo signal y(t).

Returning to FIG. 3, it is noted that functional operation of RF radar system 200 is similar to functional operation of RF radar system 100 (where RF radar system 200 includes the components of RF radar system 100), such as being similarly configured to downmix an echo signal using the chirp signal to produce a low frequency signal. However, the disclosed RF radar system 200 also includes BIST circuitry configured to implement a low-amplitude deterministic phase noise signal (also referred to as a test signal) overlaid on the echo signal in order to perform self-test concurrently or simultaneously with functional operation of the radar system 200, where such self-test verifies correct operation on both the transmitter side and the receiver side.

The BIST circuitry implements a permanent feedback path between the output node 250 of the transmitter and the input node 255 of the receiver. The feedback path includes mixer 240 having an output connected to attenuator 245. Output node 250 is connected to the first input of mixer 240. The BIST circuitry also includes a noise generator 235 having an output that is connected to a second input of mixer 240. Noise generator 235 is configured to generate a deterministic phase noise signal n(t), which generally has a flat power spectral density (PSD) in the frequency domain within the frequency band of interest, and an amplitude substantially less than the LO signal x(t), which may be the dedicated LO signal or the LO/chirp signal. It is preferred to implement a noise signal n(t) that includes a variety of different (random) frequencies, which results in a test signal that corresponds to a wide floor of component frequencies in the frequency domain across the frequency band of interest. Noise signal n(t) is uncorrelated to the LO signal and the chirp signal, and is similarly uncorrelated to the transmitted output signal and the received echo signal.

Mixer 240 is configured to mix the output signal from node 250 with the noise signal n(t) to produce an intermediate signal. It is noted that the intermediate signal has component frequencies equal to the sum and the difference of the instantaneous output signal frequency and the instantaneous noise signal frequency (e.g., f1±f2), which effectively shifts the output signal by a low frequency. This low frequency shift may be in the range of near 0 Hz up to 20 MHz, such as a frequency shift of around 10 kHz, around 1 MHz, or around 10 MHz.

Attenuator 245 is configured to attenuate the intermediate signal to produce a low-amplitude test signal N(t), which may also be referred to as a low-amplitude deterministic phase noise signal. In some embodiments, test signal N(t) is 40 to 60 dB less than the output signal at node 250. In some embodiments, attenuator 245 may be implemented by a simple voltage divider network.

The echo signal received at Rx antenna 120 is denoted as y(t), and is overlaid with test signal N(t) at input node 255, which is a combiner (such as an RF diplexer) configured to combine or add echo signal y(t) and test signal N(t) together into a combined receiver input signal that is provided to LNA 125. LNA 125 is configured to amplify this combined receiver input signal by some amplification factor, denoted as A[y(t)+N(t)]. It is noted that additional noise from the surrounding environment may be received on Rx antenna 120 in addition to the echo signal y(t). Since the LNA 125 is configured to amplify the combined receiver input signal above some noise floor (in an effort to minimize the noise picked up from the surrounding environment), the test signal N(t) may be desired to be at some level above the noise floor, but still much lower than the echo signal y(t). However, due to the long term correlation between generated and received noise, this is not required.

Mixer 130 is configured to downmix the amplified combined input signal using the LO signal x(t), which downconverts the combined input signal into a combined low frequency signal b(t)+n'(t). It is noted that since the echo signal y(t) and LO signal x(t) have the same frequency modulation, these signals downmix to DC component(s) in the low frequency signal b(t), which may be considered to be a demodulated echo signal b(t). However, since the test signal N(t) is frequency-shifted as compared with LO signal x(t), these signals downmix to component frequencies in the signal n'(t) that correspond to the frequency shift, where signal n'(t) is a version or copy of the noise signal n(t). The prime notation (') is used to acknowledge that some modification of the noise signal copy may occur as it travels along the feedback and receiver paths (e.g., modification caused by the mixers). The resulting component frequencies may fall in a range of near 0 Hz to 20 MHz, such as in a frequency band around 10 kHz, 1 MHz, or 10 MHz.

The combined low frequency signal b(t)+n'(t) is provided to both a correlator 260 and to the functional evaluation circuit (e.g., by an RF splitter or coupler), where the correlator 260 performs self-test during functional operation of the RF radar system 200. The timing diagram of FIG. 4 shows this self-test being performed concurrently with functional operation as a sequence of several blocks of time, during which the RF radar system 200 performs object detection using functional chirps even as test noise is generated and injected into the RF radar system 200 for self-test. As a result, object detection is performed concurrently with self-test. The operation of the remaining components of RF radar system for object detection is further discussed below in connection with FIG. 5.

In some embodiments, the correlator 260 is configured to continually buffer portions of both the combined low frequency signal and the noise signal, as they are received by the correlator 260. Correlator 260 uses the noise signal as a target signal to look for within the combined low frequency signal. Correlator 260 performs a correlation operation on the signals, such as multiplying samples of the signals, where the result of each multiplication is a correlation metric that indicates how much the amplitude of the combined low frequency signal sample resembles the noise signal at that location. The correlation metrics are summed and normalized to produce a correlation value having a DC value that indicates the strength of the correlation between the two signals (e.g., indicates a likelihood of the amplitude of a copy of the noise signal within the combined low frequency signal resembling the amplitude of the noise signal).

Returning to FIG. 3, the correlator 260 is configured to correlate the combined low frequency signal b(t)+n'(t) with the noise signal n(t) and output a DC voltage as an error detection signal, which is provided to functional safety logic 315, as further discussed below in connection with FIG. 5. The DC value of the error detection signal corresponds to a correlation value between the low frequency signal b(t)+n'(t) and the noise signal n(t). It is noted that signal n'(t) includes component frequencies that should correlate to component frequencies in the noise signal n(t), causing the correlator 260 to produce an expected correlation value that indicates a strong correlation exists between these signals. However, if the amplitude of the noise signal n'(t) in the combined low frequency signal is too low (which may be caused by additional attenuation caused somewhere along the feedback path and the receiver path), correlator 260 instead produces a weak correlation value that indicates a weak correlation exists between these signals. An expected floor threshold can be set below the expected correlation value within some tolerance that takes into account normal noise variations that may occur during functional operation of the RF radar system 200. The error detection signal indicates an error is detected when the correlation value falls below the expected floor threshold, which in turn indicates the amplitude of the copy of the noise signal in the combined low frequency signal is too low to be accurately correlated to the noise signal n(t). Such an error detection signal immediately indicates that RF radar system 200 has experienced a fault in real time, which may be a transient fault that erroneously changes a control signal setting and has affected the amplitude of the copy of the noise signal.

In some embodiments, an expected ceiling threshold may similarly be set above the expected correlation value, where the error detection signal indicates an error is detected when the correlation value exceeds the expected ceiling threshold and indicates an overstrong correlation exists between the signals. This may indicate the amplitude of the copy of the noise signal in the combined low frequency signal is too high, suggesting that a gain setting or attenuation setting of the RF radar system 200 has been erroneously changed.

Figure 5:
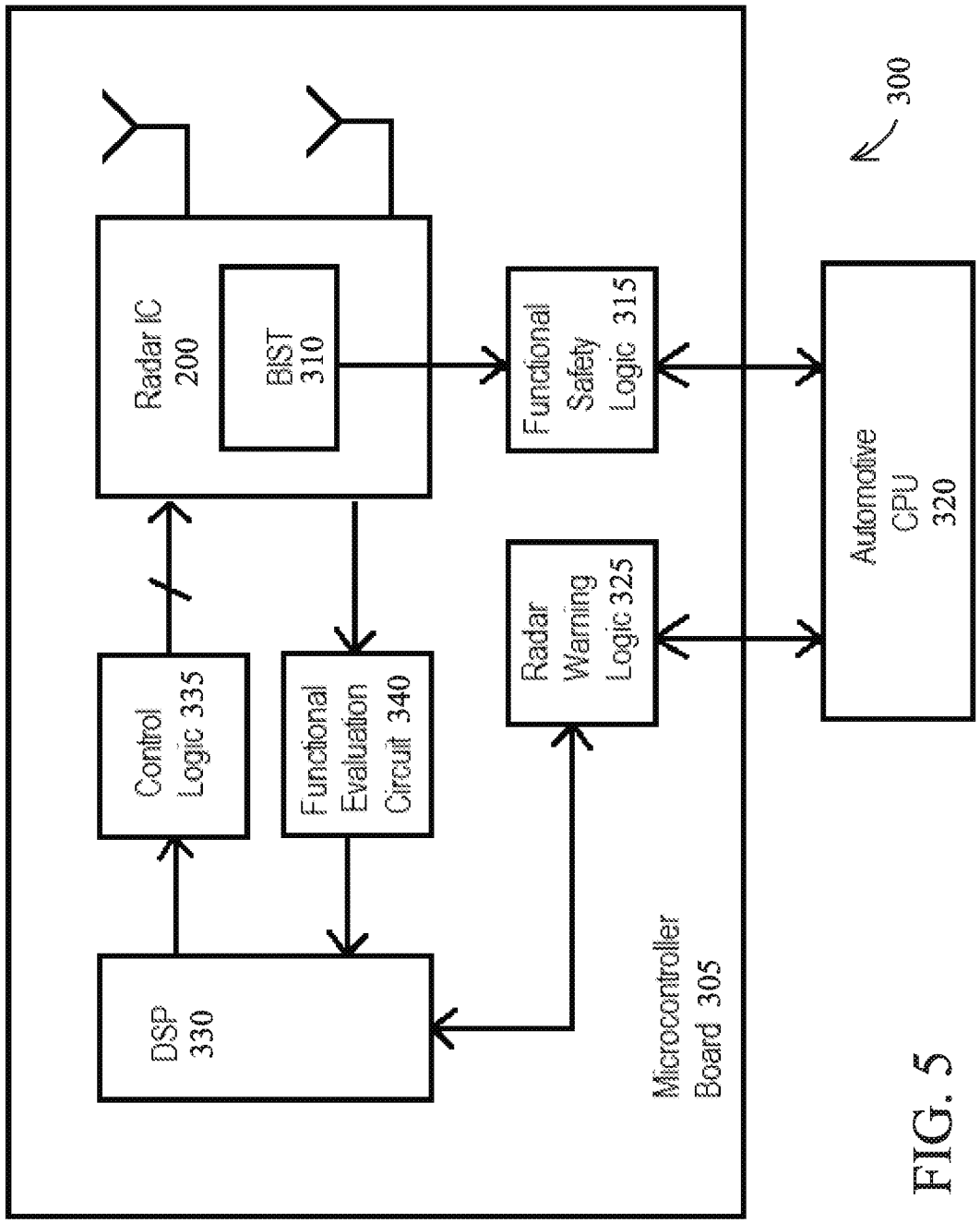
FIG. 5 illustrates a block diagram depicting an example automotive system in which the RF radar system with BIST circuitry is implemented, according to some embodiments of the present disclosure.

FIG. 5 shows an example automotive system 300 in which RF radar system 200 is implemented. In the embodiment shown, the RF block components shown in FIG. 3 are implemented as a radar integrated circuit (IC) 200 that includes BIST 310 (where BIST 310 includes noise generator 235, correlator 260, and the feedback path between transmitter output node 250 and receiver input node 255 that includes mixer 240 and attenuator 245). Radar IC 200 may be formed as part of a semiconductor die or semiconductor substrate. Such a radar IC 200 may be attached to an underlying carrier substrate such as a microcontroller board 305 to form part of a radar device, where the microcontroller board 305 includes electrically conductive features on a non-conductive substrate, formed using polyimide or FR4 or BT resin. RF radar system 200 also includes functional safety logic 315, radar warning logic 325, control logic 335, functional evaluation circuit 340, and digital signal processing (DSP) 330, which may be attached to the microcontroller board 305 to form a radar device.

DSP 330 implements a radar application, such as implementing frequency modulated continuous wave (FMCW) radar. DSP 330 may output a digital control word to control logic 335, which in turn may include a digital-to-analog-converter (DAC) that converts the digital control word into an analog signal, such as a voltage control signal. In some embodiments, control logic 335 provides this voltage control signal to the PLL or the VCO of LO 105 to produce the LO signal x(t) at LO output. Control logic 335 also implements a number of other control signals that control settings of the transmitter and receiver, such as gain or attenuation. It is noted that in some embodiments, functional evaluation circuit 340 and DSP 330 may be implemented together as a radar application specific integrated circuit (ASIC). In some embodiments, the radar ASIC may also include one or more of control logic 335, functional safety logic 315, and radar warning logic 325.

Radar IC 200 provides the combined low frequency signal b(t)+n'(t) to functional evaluation circuit 340 configured to process the signal for DSP 330, which may include filtering out unwanted aspects (e.g., spikes, harmonics, noise) and digitizing the signal for DSP 330 using an analog-to-digital-converter (ADC). DSP 330 is configured to perform calculations to determine distance and velocity information about an object, such as by using Fast Fourier Transform (FFT) or other suitable algorithm. DSP 330 is communicatively coupled to radar warning logic 325, which may store distance and velocity information and track the various objects detected around the vehicle. Radar warning logic 325 is communicatively coupled to an automotive central processing unit (CPU) 320 and is configured to provide warning indications about the tracked objects to the automotive CPU 320. Automotive CPU 320 may in turn communicate warnings about the tracked objects to the driver of the vehicle through visual displays, audio warnings or chimes, and driver assistance (e.g., decelerating the vehicle or altering the course of the vehicle).

BIST 310 performs correlation of the combined low frequency signal b(t)+n'(t) and provides the resulting error detection signal to functional safety logic 315, which is also communicatively coupled to automotive CPU 320. Functional safety logic 315 is configured to provide further warning indications to the automotive CPU 320, such as provide a present self-test status of the radar system or device based on the error detection signal. Functional safety logic 315 may also be configured to perform a course of action in response to the error detection signal. For example, functional safety logic 315 may determine from the error detection signal that the RF radar system or radar device needs to be restarted, and in response triggers a restart of the radar system or device. Functional safety logic 315 may also communicate a not-ready status to the automotive CPU until the radar system or device is operational. Functional safety logic 315 may also determine that the error detection signal indicates an irreparable failure of the radar system or device (e.g., even after restart), and in response triggers the radar system or device to power down. Functional safety logic 315 may also communicate a failure status of the radar system or device to the automotive CPU, and may further communicate an indication that the automotive CPU needs to switch over to another radar system or device present on the vehicle. Functional safety logic 315 may further monitor other values such as temperature, power supply voltages, PLL lock status, and the like.

In some embodiments, functional safety logic 315 is configured to analyze the error detection signal and determine whether a particular error of the RF radar system 200 is indicated. As discussed above, the error detection signal is a DC signal that is directly proportional to the transmitter output power, attenuation of the feedback path, and receiver gain. Since each of these aspects individually contribute to the DC signal, a change in the DC signal may indicate that one of these aspects has suffered a disturbance or fault, such as a faulty gain setting, attenuation setting, impedance setting. For example, defects or faults of the transmitter and receiver, including their mixers and their digital control circuits, may be detected based on a present DC value of the error detection signal as compared to an expected DC value. Defects or faults of the transmitting and receiving antennas may also be detected since such defects or faults often cause impedance mismatch at the transmitter output or at the receiver input. This mismatch changes the transmitter output power level or the input impedance of the receiver, which changes the power level of the overlaid noise signal at the receiver input and in turn changes the DC value of the error detection signal.

Figure 6:
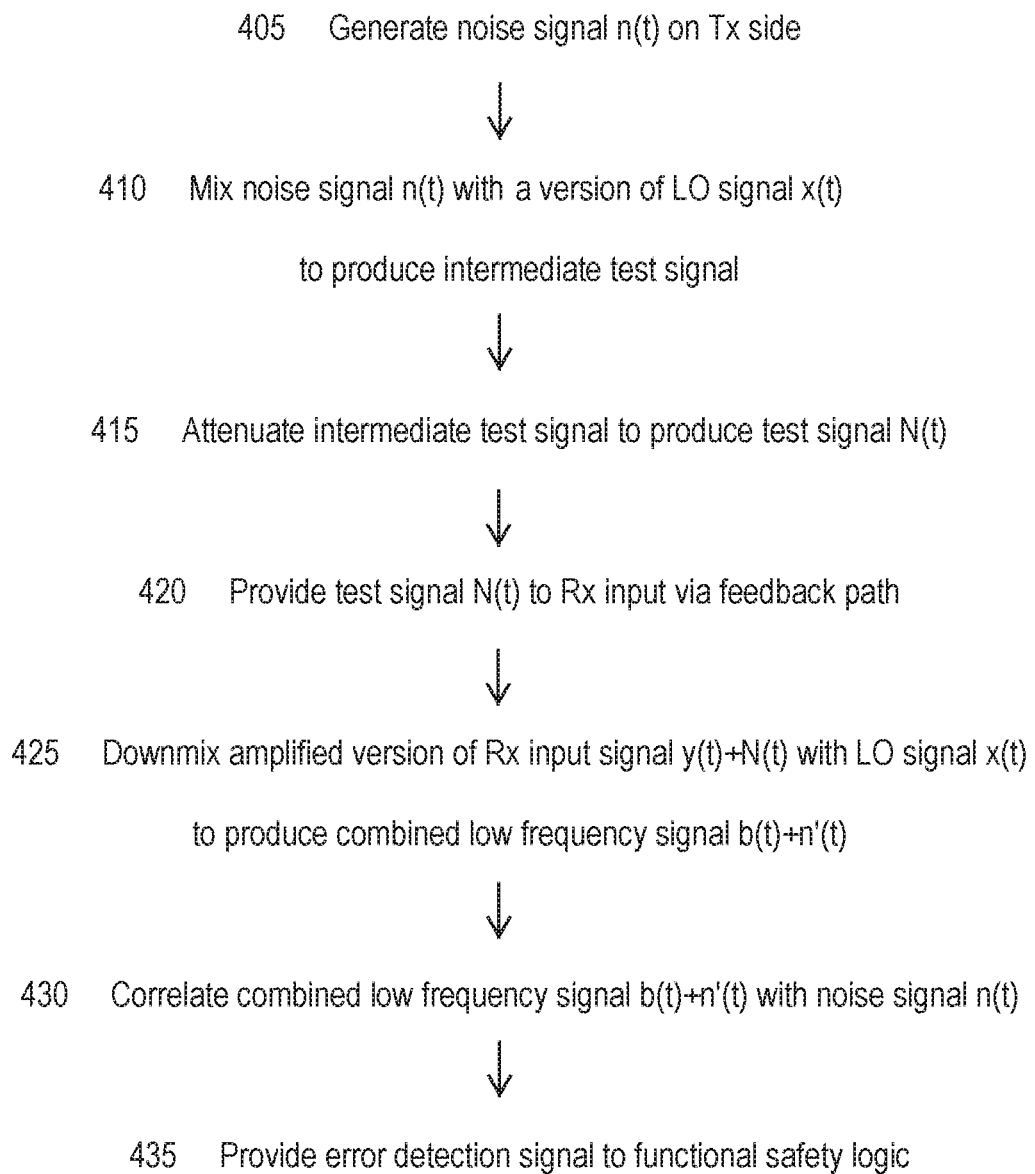
FIG. 6 illustrates a flowchart depicting an example method of operating the RF radar system with BIST circuitry, according to some embodiments of the present disclosure.

FIG. 6 illustrates a flowchart depicting an example method of operating the disclosed RF radar system with BIST, as discussed above. The method begins at operation 405, where a noise signal n(t) is generated on the transmitter (Tx) side of the radar system. Operation 405 may also include concurrently generating a LO signal x(t) on the Tx side of the radar system. In some embodiments, the LO signal x(t) may implement the chirp signal, while in other embodiments the LO signal x(t) is used to implement chirp signal c(t). The method continues to operation 410, where the noise signal n(t) is mixed with a version of the LO signal x(t) to produce an intermediate test signal, where the version of the LO signal x(t) may be an amplified version of the LO/chip signal x(t) or may be the chirp signal c(t) that was upmixed using dedicated LO signal x(t), depending on the embodiment. Operation 410 may also include concurrently transmitting the amplified version of the chirp signal (which may be x(t) or c(t), depending on the embodiment) on Tx antenna. The method continues to operation 415, where the intermediate test signal is attenuated to produce test signal N(t). It is noted that operations 410 and 415 are implemented on a feedback path between the Tx output and the Rx input.

The method continues to operation 420, where the test signal N(t) is provided to the Rx input via the feedback path. Operation 420 may also include concurrently receiving an echo signal y(t) on Rx antenna. It is noted that the test signal N(t) is added or combined with the echo signal y(t) to provide a combined Rx input signal at the Rx input. The method continues to operation 425, where an amplified version of the Rx input signal y(t)+N(t) is downmixed with the chirp signal x(t) to produce a combined low frequency signal b(t)+n'(t). The method continues to operation 430, where the low frequency signal is correlated with noise signal n(t) to produce an error detection signal. Operation 430 may also include concurrently performing object detection by processing the low frequency signal to determine distance and velocity information. The method continues to operation 435, where the error detection signal is provided to functional safety logic, which performs one or more actions in response to the error detection signal to ensure driver safety.

As noted above, the radar IC may be implemented on a semiconductor die or substrate, which can be any semiconductor material or combinations of materials, such as gallium arsenide, silicon germanium, silicon-on-insulator (SOI), silicon, monocrystalline silicon, the like, and combinations of the above. The active circuitry on the semiconductor die or substrate is formed using a sequence of numerous process steps applied to a semiconductor wafer, including but not limited to depositing semiconductor materials including dielectric materials and metals, such as growing, oxidizing, sputtering, and conformal depositing, etching semiconductor materials, such as using a wet etchant or a dry etchant, planarizing semiconductor materials, such as performing chemical mechanical polishing or planarization, performing photolithography for patterning, including depositing and removing photolithography masks or other photoresist materials, ion implantation, annealing, and the like. Examples of integrated circuit components include but are not limited to a processor, memory, logic, analog circuitry, sensor, MEMS (microelectromechanical systems) device, a standalone discrete device such as a resistor, inductor, capacitor, diode, power transistor, and the like. In some embodiments, the active circuitry may be a combination of the integrated circuit components listed above or may be another type of microelectronic device.

As used herein, a "node" means any internal or external reference point, connection point, junction, signal line, conductive element, or the like, at which a given signal, logic level, voltage, data pattern, current, or quantity is present. Furthermore, two or more nodes may be realized by one physical element (and two or more signals can be multiplexed, modulated, or otherwise distinguished even though received or output at a common mode).

The following description refers to nodes or features being "connected" or "coupled" together. As used herein, unless expressly stated otherwise, "coupled" means that one node or feature is directly or indirectly joined to (or is in direct or indirect communication with) another node or feature, and not necessarily physically. As used herein, unless expressly stated otherwise, "connected" means that one node or feature is directly joined to (or is in direct communication with) another node of feature. Furthermore, although the various schematics shown herein depict certain example arrangements of elements, additional intervening elements, devices, features, or components may be present in an actual embodiment (assuming that the functionality of the given circuit is not adversely affected).

By now it should be appreciated that there has been provided a built-in self-test (BIST) solution that is capable of detecting disturbances in an RF radar system in real time, where the BIST is performed concurrently during functional operation of the RF radar system, during which time the RF radar system performs object detection using functional chirps even as test noise is generated and injected into the RF radar system 200 for self-test.

In one embodiment of the present disclosure a method for operating a radar device is provided, the radar device having a transmitter and a receiver, the method including: generating a noise signal; mixing the noise signal with a transmitter output radio frequency (RF) signal to produce an intermediate signal, wherein the transmitter output RF signal is a version of a local oscillator (LO) signal having linearly increasing frequency; attenuating the intermediate signal to produce a test signal; adding the test signal to a receiver input RF signal to produce a combined receiver input RF signal; downmixing an amplified version of the combined receiver input RF signal with the LO signal to produce a combined low frequency signal; and correlating the combined low frequency signal with the noise signal to produce an error detection signal.

One aspect of the above embodiment provides that the error detection signal indicates a likelihood that an amplitude of a copy of the noise signal within the combined low frequency signal is below an expected threshold.

Another aspect of the above embodiment provides that the error detection signal indicates an error is detected when a weak correlation exists between the combined low frequency signal and the noise signal.

Another aspect of the above embodiment provides that the test signal includes a frequency shift as compared with the LO signal, and the combined low frequency signal includes component frequencies that correspond to the frequency shift.

Another aspect of the above embodiment provides that the method further includes: providing the error detection signal to functional safety logic, wherein the functional safety logic is communicatively coupled to an automotive CPU (central processing unit), and the functional safety logic indicates a present self-test status of the radar device based on the error detection signal.

Another aspect of the above embodiment provides that the method further includes: transmitting a functional chirp signal as the transmitter output RF signal on a transmitting antenna, wherein the transmitting occurs concurrently with the mixing the noise signal with the transmitter output RF signal.

Another aspect of the above embodiment provides that the method further includes: receiving an echo signal of the transmitter output RF signal as the receiver input RF signal from a receiving antenna, wherein the receiving occurs concurrently with the adding the test signal to the receiver input RF signal.

Another aspect of the above embodiment provides that the method further includes: processing the combined low frequency signal, wherein the processing occurs concurrently with the correlating the combined low frequency signal with the noise signal.

Another aspect of the above embodiment provides that the radar device implements frequency modulated continuous wave (FMCW) radar.

In another embodiment of the present disclosure, a radar device is provide, which includes: a transmitter configured to transmit an output radio frequency (RF) signal including a version of a local oscillator (LO) signal having linearly increasing frequency; a receiver configured to receive an input RF signal; a noise generator configured to generate a noise signal; a feedback path connected between an output of the transmitter and an input of the receiver, the feedback path including a first mixer and an attenuator, the first mixer configured to mix the output RF signal with the noise signal to produce an intermediate signal, and the attenuator configured to attenuate the intermediate signal to produce a test signal; a combiner configured to combine the test signal with the input RF signal to produce a combined input RF signal, wherein the receiver includes a second mixer configured to downmix an amplified version of the combined input RF signal with the LO signal to produce a combined low frequency signal; and a correlator configured to output an error detection signal based on a correlation of the combined low frequency signal with the noise signal.

One aspect of the above embodiment provides that the error detection signal indicates a likelihood that an amplitude of a copy of the noise signal within the combined low frequency signal is below an expected threshold.

Another aspect of the above embodiment provides that the correlator is configured to output a low correlation value as the error detection signal when a weak correlation exists between the combined low frequency signal and the noise signal, wherein the low correlation value indicates an error is detected.

Another aspect of the above embodiment provides that the test signal includes a frequency shift as compared with the LO signal, and the combined low frequency signal includes component frequencies that correspond to the frequency shift.

Another aspect of the above embodiment provides that the radar device further includes: functional safety logic communicatively coupled to an automotive CPU (central processing unit), wherein the functional safety logic is configured to communicate a present self-test status of the radar device based on the error detection signal.

Another aspect of the above embodiment provides that the radar device further includes: control logic coupled to the transmitter, the control logic configured to control the transmitter to output a functional chirp signal as the output RF signal on a transmitting antenna concurrently as the first mixer mixes the functional chirp signal with the noise signal.

Another aspect of the above embodiment provides that an echo signal of the output RF signal is received from a receiving antenna as the input RF signal, and the input of the receiver receives the combination of the echo signal with the test signal.

A further aspect of the above embodiment provides that the functional safety logic is further configured to analyze a present value of the error detection signal to determine whether a particular error of the radar device is indicated.

A still further aspect of the above embodiment provides that the error detection signal includes a DC (direct current) signal having contributory components that correspond to one or more of a group including: transmitter output power, attenuation of the feedback path, and receiver gain.

Another further aspect of the above embodiment provides that the functional safety logic is further configured to perform one of a group of actions including: restart the radar device, power down the radar device, communicate a not-ready status to the automotive CPU, communicate a failure status to the automotive CPU, and communicate an indication to switch over to another radar device to the automotive CPU.

Another aspect of the above embodiment provides that the radar device further includes: a functional evaluation circuit configured to process and digitize the combined low frequency signal into a digitized low frequency signal; and a digital signal processor to process the digitized low frequency signal to determine distance and velocity information, concurrently as the correlator compares the combined low frequency signal with the noise signal.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

As used herein, the terms "substantial" and "substantially" mean sufficient to achieve the stated purpose or value in a practical manner, taking into account any minor imperfections or deviations, if any, that arise from usual and expected abnormalities that may occur during functional operation of the RF radar device, which are not significant for the stated purpose or value. Also as used herein, the terms "approximately" and "around" mean a value close to or within an acceptable range of an indicated value, amount, or quality, which also includes the exact indicated value itself.

Although the invention is described herein with reference to specific embodiments, various modifications and changes can be made without departing from the scope of the present invention as set forth in the claims below. For example, additional or fewer transmission channels may be implemented in the RF radar system shown in FIG. 3. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A radar device comprising:
   a transmitter configured to transmit an output radio frequency (RF) signal comprising a version of a local oscillator (LO) signal having linearly increasing frequency;
   a receiver configured to receive an input RF signal;
   a noise generator configured to generate a noise signal;
   a feedback path connected between an output of the transmitter and an input of the receiver, the feedback path comprising a first mixer and an attenuator, the first mixer configured to mix the output RF signal with the noise signal to produce an intermediate signal, and the attenuator configured to attenuate the intermediate signal to produce a test signal;
   a combiner configured to combine the test signal with the input RF signal to produce a combined input RF signal, wherein
      the receiver comprises a second mixer configured to downmix an amplified version of the combined input RF signal with the LO signal to produce a combined low frequency signal; and
   a correlator configured to output an error detection signal based on a correlation of the combined low frequency signal with the noise signal.

2. The radar device of claim 1, wherein the error detection signal indicates a likelihood that an amplitude of a copy of the noise signal within the combined low frequency signal is below an expected threshold.

3. The radar device of claim 1, wherein the correlator is configured to, in response to an amplitude of a copy of the noise signal within the combined low frequency signal being below an expected threshold, output a low correlation value as the error detection signal to indicate a weak correlation between the combined low frequency signal and the noise signal, wherein the low correlation value indicates an error is detected.

4. The radar device of claim 1, wherein the test signal comprises a frequency shift as compared with the LO signal, and the combined low frequency signal comprises component frequencies that correspond to the frequency shift.

5. The radar device of claim 1, further comprising:
   functional safety logic communicatively coupled to an automotive CPU (central processing unit), wherein the functional safety logic is configured to communicate a present self-test status of the radar device based on the error detection signal.

6. The radar device of claim 1, further comprising:
   control logic coupled to the transmitter, the control logic configured to control the transmitter to output a functional chirp signal as the output RF signal on a transmitting antenna concurrently as the first mixer mixes the functional chirp signal with the noise signal.

7. The radar device of claim 1, wherein
   an echo signal of the output RF signal is received from a receiving antenna as the input RF signal, and
   the input of the receiver receives the combination of the echo signal with the test signal.

8. The radar device of claim 5, wherein
   the functional safety logic is further configured to analyze a present value of the error detection signal to determine whether a particular error of the radar device is indicated.

9. The radar device of claim 8, wherein
   the error detection signal comprises a DC (direct current) signal having contributory components that correspond to one or more of a group including: transmitter output power, attenuation of the feedback path, and receiver gain.

10. The radar device of claim 5, wherein
    the functional safety logic is further configured to perform one of a group of actions including: restart the radar device, power down the radar device, communicate a not-ready status to the automotive CPU, communicate a failure status to the automotive CPU, and communicate an indication to switch over to another radar device to the automotive CPU.

11. The radar device of claim 1, further comprising:
    a functional evaluation circuit configured to process and digitize the combined low frequency signal into a digitized low frequency signal; and
    a digital signal processor to process the digitized low frequency signal to determine distance and velocity information, concurrently as the correlator compares the combined low frequency signal with the noise signal.

* * * * *